United States Patent
Shi et al.

(10) Patent No.: US 10,642,938 B2
(45) Date of Patent: May 5, 2020

(54) ARTIFICIAL INTELLIGENCE BASED METHOD AND APPARATUS FOR CONSTRUCTING COMMENT GRAPH

(71) Applicant: BEIJING BAIDU NETCOM SCIENCE AND TECHNOLOGY CO., LTD., Beijing (CN)

(72) Inventors: Yingchao Shi, Beijing (CN); Jianqing Cui, Beijing (CN); Wei He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/942,297

(22) Filed: Mar. 30, 2018

(65) Prior Publication Data
US 2018/0349355 A1  Dec. 6, 2018

(30) Foreign Application Priority Data
May 31, 2017 (CN) .......................... 2017 1 0400557

(51) Int. Cl.
*G06F 17/27* (2006.01)
*G06N 5/02* (2006.01)
(Continued)

(52) U.S. Cl.
CPC ........ *G06F 17/2785* (2013.01); *G06F 17/241* (2013.01); *G06F 17/277* (2013.01);
(Continued)

(58) Field of Classification Search
CPC .. G06F 17/2785; G06F 17/241; G06F 17/277; G06F 17/2775; G06F 17/2795; G06N 5/02
(Continued)

(56) References Cited

U.S. PATENT DOCUMENTS

2008/0215607 A1* 9/2008 Kaushansky ....... G06F 16/9535
2011/0209043 A1   8/2011 Guo et al.
2017/0078621 A1* 3/2017 Sahay ..................... G06F 16/51

FOREIGN PATENT DOCUMENTS

CN       104462363 A       3/2015
CN       104933130 A       9/2015
(Continued)

*Primary Examiner* — Quynh H Nguyen
(74) *Attorney, Agent, or Firm* — Lathrop GPM LLP

(57) ABSTRACT

The present disclosure discloses an artificial intelligence based method and apparatus for constructing a comment graph. A specific embodiment of the method comprises: determining a comment text based on comment data on a network page; identifying a comment subject and a comment opinion in the comment text, based on a characteristic in the comment text; generating a subject opinion pair including the comment subject, the comment opinion and an emotional tendency based on the comment subject and the comment opinion; generating a comment label associated with the subject opinion pair based on news information; and generating a comment graph, based on the comment label and the subject opinion pair. This embodiment improves the pertinence and the accuracy of the comment and the control to the comment emotion, when providing comments externally.

21 Claims, 6 Drawing Sheets

(51) Int. Cl.
  *G06F 17/24* (2006.01)
  *G06N 20/10* (2019.01)
  *G06N 7/00* (2006.01)

(52) U.S. Cl.
  CPC ...... *G06F 17/2775* (2013.01); *G06F 17/2795* (2013.01); *G06N 5/02* (2013.01); *G06N 5/022* (2013.01); *G06N 20/10* (2019.01); *G06N 7/005* (2013.01)

(58) Field of Classification Search
  USPC .......................................................... 704/9
  See application file for complete search history.

(56) References Cited

FOREIGN PATENT DOCUMENTS

| | | |
|---|---|---|
| CN | 105512333 A | 4/2016 |
| CN | 106354857 A | 1/2017 |

\* cited by examiner

ARTIFICIAL INTELLIGENCE BASED METHOD AND APPARATUS FOR CONSTRUCTING COMMENT GRAPH

CROSS-REFERENCE TO RELATED APPLICATIONS

This application is related to and claims priority from Chinese Patent Application No. 201710400557.8, filed with the State Intellectual Property Office (SIPO) of the People's Republic of China on May 31, 2017, the entire disclosure of the Chinese patent application is hereby incorporated by reference.

TECHNICAL FIELD

The present application relates to the field of computer technology, specifically to the field of computer Internet technology, and more specifically to an artificial intelligence based method and apparatus for constructing a comment graph.

BACKGROUND

The rapid development of artificial intelligence (AI for short) technique provides convenience to people's daily work and life. Artificial intelligence is a new technological science which researches on and develops theories, methods, techniques and application systems for simulating, extending and expanding human intelligence. As a branch of the computer science, artificial intelligence attempts to learn about the principle of intelligence and produce a novel intelligent machine capable of making response in a way similar to human intelligence. The researches in this field include robot, language recognition, image recognition, natural language processing and expert systems, etc. Artificial intelligence is increasingly integrated into applications. Combined with the artificial intelligence, applications can accurately determine the type of the information and push different types of information to appropriate users based on the needs of different users.

Along with the rapid development of artificial intelligence, how to make machines that possess human-like intelligence has become a task many enterprises hope to accomplish. Under this circumstance, it is our hope that a machine can read a text and provide commentaries with its own opinions or offer Internet users' general opinions on the text.

Current machine comments retrieve in general, the relevant news comments, based on news keywords and using conventional information retrieval techniques, and select the mostly relevant comments based on the relevance between the news and the relevance between the news and the comments.

However, the current machine comments only repeat what others have said and the comments provided are necessarily comments that are already made by the users on the same or similar news. A machine itself may not understand the news contents and the contents in the comments. Since retrieval and recall are based on the relevance between the news and the comments, the problem that unpopular news cannot be recalled generally exists. If restrictions on relevance are lifted, irrelevant replies may easily be generated, resulting in heavy dependencies on the timeliness, quality and size of the comment databases, and consequently, weak influence and low recall rates.

SUMMARY

The objective of the present disclosure is to provide an improved artificial intelligence based method and apparatus for constructing a comment graph, in order to solve the technical problem mentioned in the foregoing Background section.

In a first aspect, embodiments of the present disclosure provides an artificial intelligence based method for constructing a comment graph, the method including: determining a comment text based on comment data on a network page; identifying a comment subject and a comment opinion in the comment text, based on a characteristic in the comment text; generating a subject opinion pair including the comment subject, the comment opinion and an emotional tendency based on the comment subject and the comment opinion; generating a comment label associated with the subject opinion pair based on news information; and generating a comment graph, based on the comment label and the subject opinion pair.

In some embodiments, the generating a subject opinion pair including the comment subject, the comment opinion and an emotional tendency based on the comment subject and the comment opinion includes: extracting the subject opinion pair comprising the comment subject, the comment opinion and the emotional tendency based on the comment subject, the comment opinion and one or more of: text information, co-occurrence information and an entity type of the comment text.

In some embodiment, the generating a comment label associated with the subject opinion pair based on news information includes: determining a news label based on the news information; calculating a correlation between the news label and the comment text; and determining the news label having the correlation meeting a preset threshold value as the comment label associated with the subject opinion pair.

In some embodiments, the determining a news label based on the news information includes: determining a weight of words using a weight model, based on a predetermined characteristic of the words in the news information; and determining the news label, based on the weight of the words and a characteristic commonly occurring between the words.

In some embodiments, the weight model is determined by the following steps: acquiring a news information sample; and training the weight model using a support vector machine, based on the predetermined characteristic of the words in the news information sample.

In some embodiments, the determining a news label based on the news information further includes: extracting an event from the news information, the event comprising an event type and an event element; and determining the event as the news label if there exists an event element selected as the news label among the event element.

In some embodiments, the calculating a correlation between the news label and the comment text includes one or more of: calculating a correlation between a proper noun or phrase in the news label and the comment subject, according to a thesaurus; calculating a correlation between the proper noun in the news label and the comment subject, based on a preset corresponding rule for the proper nouns; calculating a similarity between a vector generated from words in the news label and a vector generated from the comment subject based on a text depth representation model; calculating a similarity between a vector generated from words of the event and the vector generated from the comment opinion, based on the text depth representation model; and calculating a similarity between the vector generated from the words in the news label and a vector generated from notional words in the comment text after excluding the subject and the opinion, based on the text depth representation model.

In some embodiments, the generating a comment graph, based on the comment label and the subject opinion pair includes: determining the comment label as label nodes of the comment graph; determining the subject opinion pair as comment nodes of the comment graph; and establishing a connecting relationship between the label nodes and the comment nodes corresponding to the label nodes.

In some embodiments, the generating a comment graph, based on the comment label and the subject opinion pair further includes: establishing a connecting relationship between the comment nodes that are semantically associated; and/or establishing a connecting relationship between the label nodes that are semantically identical.

In some embodiments, the establishing a connecting relationship between the comment nodes that are semantically associated includes: establishing a connecting relationship between the comment nodes that are semantically identical and/or semantically opposite.

In a second aspect, the embodiments of the present disclosure provides a method for generating a news comment, the method including: determining a weight of words using a weight model, based on a predetermined characteristic of the words in news information; determining a news label, based on the weight of the words and the characteristic commonly occurring between the words; determining, based on the news label and a comment graph constructed according to the artificial intelligence based method for constructing a comment graph, a subject opinion pair corresponding to the news label in the comment graph; and generating the news comment, based on the determined subject opinion pair.

In a third aspect, the embodiments of the present disclosure provides an artificial intelligence based apparatus for constructing a comment graph, the apparatus including: a comment text determination unit, configured for determining a comment text based on comment data on a network page; a subject opinion identification unit, configured for identifying a comment subject and a comment opinion in the comment text, based on a characteristic in the comment text; a subject opinion pair generation unit, configured for generating a subject opinion pair including the comment subject, the comment opinion and an emotional tendency based on the comment subject and the comment opinion; a comment label generation unit, configured for generating a comment label associated with the subject opinion pair based on news information; and a comment graph generation unit, configured for generating a comment graph, based on the comment label and the subject opinion pair.

In some embodiments, the subject opinion pair generation unit is further configured for: extracting the subject opinion pair comprising the comment subject, the comment opinion and the emotional tendency based on the comment subject, the comment opinion and one or more of: text information, co-occurrence information and an entity type of the comment text.

In some embodiments, the comment label generation unit includes: a news label determination unit, configured for determining a news label based on the news information; a correlation calculation unit, configured for calculating a correlation between the news label and the comment text; and a comment label determination unit, configured for determining the news label having the correlation meeting a preset threshold value as the comment label associated with the subject opinion pair.

In some embodiments, the news label determination unit includes: a words weight determination subunit, configured for determining a weight of words using a weight model, based on a predetermined characteristic of the words in the news information; and a news label determination subunit, configured for determining the news label, based on the weight of the words and a characteristic commonly occurring between the words.

In some embodiments, the weight model in the words weight determination subunit is determined by the following steps: acquiring a news information sample; and training the weight model using a support vector machine, based on the predetermined characteristic of the words in the news information sample.

In some embodiments, the news label determination unit further includes: a news event extraction subunit, configured for extracting an event from the news information, the event comprising an event type and an event element; and a news event determination subunit, configured for determining the event as the news label if there exists an event element selected as the news label among the event element.

In some embodiments, the correlation calculation unit is further configured for one or more of: calculating a correlation between a proper noun or phrase in the news label and the comment subject, according to a thesaurus; calculating a correlation between the proper noun in the news label and the comment subject, based on a preset corresponding rule for the proper nouns; calculating a similarity between a vector generated from words in the news label and a vector generated from the comment subject based on a text depth representation model; calculating a similarity between a vector generated from words of the event and the vector generated from the comment opinion, based on the text depth representation model; and calculating a similarity between the vector generated from the words in the news label and a vector generated from notional words in the comment text after excluding the subject and the opinion, based on the text depth representation model.

In some embodiments, the comment graph generation unit includes: a label node determination unit, configured for determining the comment label as label nodes of the comment graph; a comment node determination unit, configured for determining the subject opinion pair as comment nodes of the comment graph; and a label comment connecting unit, configured for establishing a connecting relationship between the label nodes and the comment nodes corresponding to the label nodes.

In some embodiments, the comment graph generation unit further includes: an associated comment connecting unit, configured for establishing a connecting relationship between the comment nodes that are semantically associated; and/or a semantically identical label connecting unit, configured for establishing a connecting relationship between the label nodes that are semantically identical.

In some embodiments, the associated comment connecting unit includes: a semantic comment connecting unit, configured for establishing a connecting relationship between the comment nodes that are semantically identical and/or semantically opposite.

In a fourth aspect, the embodiments of the present disclosure provides an apparatus for generating a news comment, the apparatus including: a words weight determination unit, configured for determining a weight of words using a weight model, based on a predetermined characteristic of the words in news information; a news label determination unit, configured for determining a news label, based on the weight of the words and a characteristic commonly occurring between the words; a subject opinion pair determination unit, configured for determining, based on the news label and the comment graph constructed according to the artificial intelligence based apparatus for constructing a comment graph according to any one of the above, a subject opinion pair corresponding to the news label in the comment graph; and a news comment generation unit, configured for generating the news comment, based on the determined subject opinion pair.

In a fifth aspect, the embodiments of the present disclosure provide a device, including: one or more processors; a storage apparatus, to store one or more programs; and when the one or more programs being executed by the one or more processors, cause the one or more processors to implement the artificial intelligence based method for constructing a comment graph of any one of the above.

In a sixth aspect, the embodiments of the present disclosure provide a computer readable storage medium, storing a computer program thereon, the computer program, when executed by a processor, implements the artificial intelligence based method for constructing a comment graph of any one of the above.

The artificial intelligence based method and apparatus for constructing a comment graph provided by the embodiments of the present disclosure first determine a comment text based on comment data on a network page; then, identify a comment subject and a comment opinion in the comment text, based on a characteristic in the comment text; then, generate a subject opinion pair including the comment subject, the comment opinion and an emotional tendency based on the comment subject and the comment opinion; then, generate a comment label associated with the subject opinion pair; and finally generate a comment graph, based on the comment label and the subject opinion pair. The comment graph provided by the present embodiments may provide comment contents and comment emotions based on the subject opinion pair and may provide an application environment of the comment content based on the comment label, thereby improving the pertinence and the accuracy of the comment and the control to the comment emotion, when providing comments externally, and because of the abundant source and the extensive coverage of constructing the comment graph, the comments provided externally also reflect the majority of the comment opinions and improve the application range of the comment graph.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
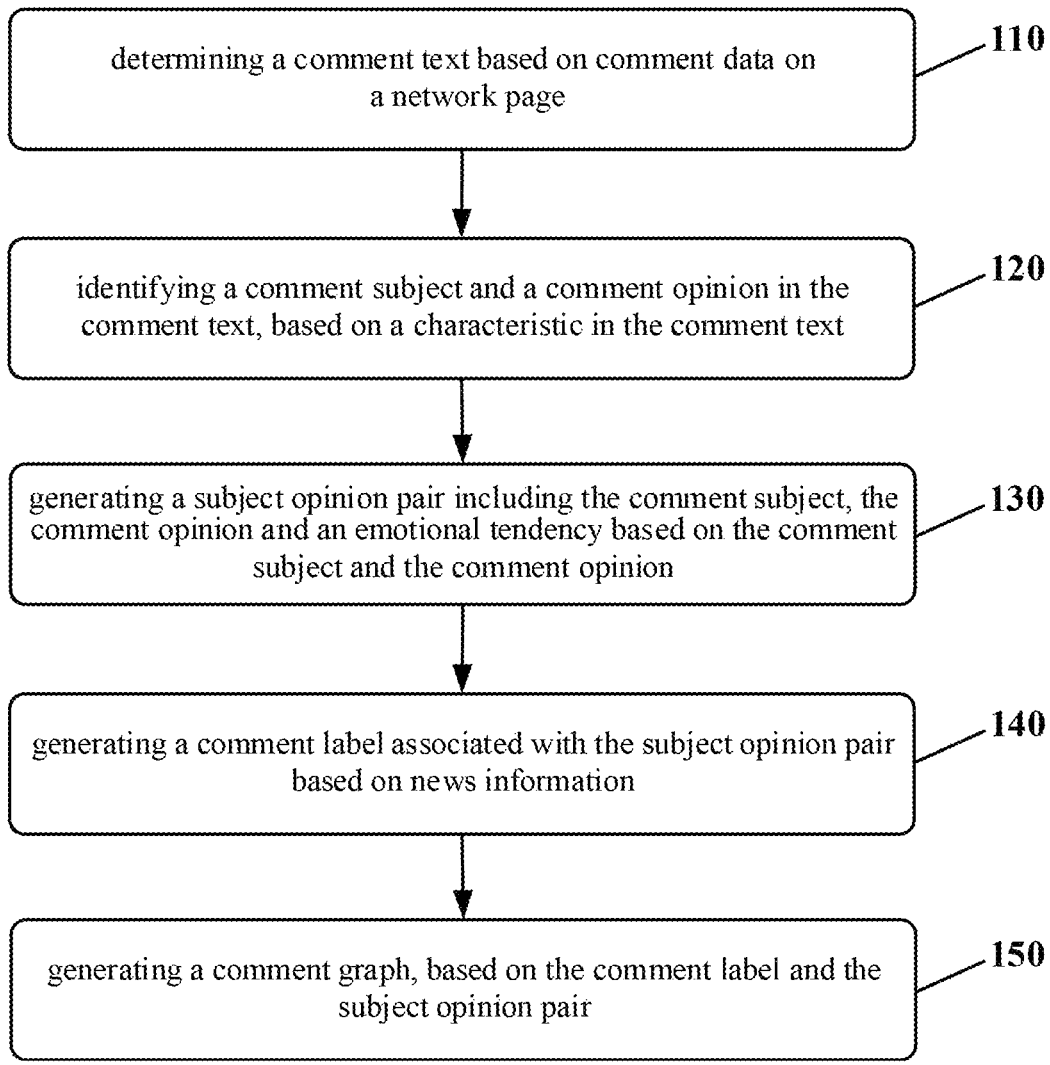
FIG. 1 is a schematic flowchart of an embodiment of an artificial intelligence based method for constructing a comment graph according to the present disclosure.

FIG. 1 shows a flow 100 of an embodiment of an artificial intelligence based method for constructing a comment graph according to the present disclosure. The artificial intelligence based method for constructing a comment graph includes:

Step 110, determining a comment text based on comment data on a network page.

In the present embodiment, the web page refers to a page used in the Internet network, such as a microblog page, a BBS page, an internet web page and a User Generated Content (UGC). The specific process of excavating a text with an emotional tendency from the mass of Internet pages, the microblog and the UGC resources is as follows: first, targetedly capturing comment web pages, news information comments, website data from the BBS and the microblog and other websites potentially having comment data using the web crawler, then, extracting web page contents and segmenting sentences, generating potential comment sentences, and then selecting sentences with emotional tendency, i.e., the excavated comment text, using the emotional tendency analysis technology.

Step 120, identifying a comment subject and a comment opinion in the comment text, based on a characteristic in the comment text.

In the present embodiment, most of the comment texts excavated from the web pages are UGC comments from netizens. These data are unstructured data. That is, the machine does not know the comment objects and the comment opinions of these sentences at all and therefore the comment subjects need to be identified and the comment opinions needs to be identified.

When the comment subject and the comment opinion are identified, a semantic identification technology of the existing technology or the technology to be developed in the future may be adopted, which is not limited in the present disclosure. For example, the comment subject and the comment opinion may be identified by using models such as the Hidden Markov Model (HMM), the Maximum Entropy Markov Model (MEMM) and the Conditional Random Field (CRF).

Specifically, taking the CRF as an example, the characteristics in the comment text used by the CRF model may mainly include: a word characteristic, a semantics characteristic, an entity characteristic and a syntax characteristic. For example, in the comment text "AA article is quite good to look," the comment subject is "AA article," and the comment opinion is "quite good;" and in the comment text "I like BBB," the comment subject is "BBB," and the comment opinion is "I like."

Step 130, generating a subject opinion pair including the comment subject, the comment opinion and an emotional tendency based on the comment subject and the comment opinion.

In the present embodiment, based on the comment subject and the comment opinion identified in step 120, a subject opinion pair including the comment subject, the comment opinion and an emotional tendency may be extracted. On this basis, other constraint conditions for extracting the subject opinion pair may also be added. For example, the subject opinion pair comprising the comment subject, the comment opinion and the emotional tendency may be extracted based on the comment subject, the comment opinion and one or more of the following: text information, co-occurrence information and an entity type of the comment text. The text information here refers to the space information and the chapter information, and the entity type refers to a set of the entities having a common element.

Step 140, generating a comment label associated with the subject opinion pair based on news information.

In the present embodiment, the comment label is a set of words for constraining the application environment of the comment. For example: the news is "XXX studio discloses a bed photo of XXX, but netizens found the secret," in which a comment is: "support XXX, who has experienced hard time from the countryside to here step by step, and not contrived, has a rural fresh and honest, unlike some stars who are too contrived," and the generated subject opinion pairs are: <XXX, support, +>, <XXX, has experienced hard time from the countryside to here step by step, +>, <XXX, not contrived, +>, <XXX, rural fresh and honest, +>, <XXX, unlike some stars who are too contrived, +>. Based on these views, we may generate a lot of comments, such as: "support XXX," "support XXX, has experienced hard time from the countryside to here step by step," "XXX has a rural fresh and honest, unlike some stars who are too contrived." And when these opinions may be used to comment XXX? This is the main role of the comment label. Therefore, based on our labeling, the label of these comments is "XXX." Therefore, any news that reports "XXX" may be commented using these comments. For example, the news is "Exposure from the Internet that XXX, YYY fake play comes true, their love affair is confirmed, and love affair details of XXX, YYY are dug up," or, for example, "For the eating, TTT, XXX are praised for being real, but GGG experiences defaming."

Step 150, generating a comment graph, based on the comment label and the subject opinion pair.

In the present embodiment, the construction of the comment graph involves mainly storing the comment label and the subject opinion pair into a structured form.

In some alternative implementations of the present embodiment, the generating a comment graph, based on the comment label and the subject opinion pair includes: determining the comment label as label nodes of the comment graph; determining the subject opinion pair as comment nodes of the comment graph; and establishing a connecting relationship between the label nodes and the comment nodes corresponding to the label nodes.

In the present implementation, the subject opinion pair associated with the comment label may be obtained by connecting the label nodes and the comment nodes. For example, for the label nodes, the label of the comment as well as some attributes of the label are mainly stored. Attributes may be of type (including action words, names, place names, book titles, movie titles, etc.). Among them, the comment label refers to actual meaningful words or phrases, such as proper names, nouns, notional verbs. For example: "XXX," "love affair is confirmed," "YYY." The comment nodes store specific comment contents, including: the comment subject, the comment opinion, and the emotional tendency of the comment, for example: <XXX, support, +>, <YYY, incredibly handsome, +>. The connecting relationship is reflected as the edge between the label nodes and the comment nodes in the comment graph. The edge between the label nodes and the comment nodes mainly refers to that the corresponding comment may be used to comment the corresponding label. For example: if a certain news label contains YYY, we may use <YYY, incredibly handsome, +> to make a comment, and "YYY is really incredibly handsome" may be generated.

Further, the generating a comment graph, based on the comment label and the subject opinion pair may also includes: establishing a connecting relationship between the comment nodes that are semantically associated; and/or establishing a connecting relationship between the label nodes that are semantically identical.

Here, the edge between a comment node and another comment node mainly describes the relationship between the comment nodes, and at present includes: in case of the synonymous relationship, interchangeable use is possible, and the antonymous relationship is an opposite opinion of commenting on the same attribute. The edge between a label node and another label node mainly describes the relationship between the label nodes. At present, there is mainly the synonymous relationship.

The service provided by the comment graph constructed by the artificial intelligence based method for constructing a comment graph provided by the above embodiment of the present disclosure is no longer like the other search comment systems which can cover only part of the news information, but can generate comments based on specific points of the news information, with a higher comment coverage, and it is no longer like the other search comment systems which only copy similar news comments blindly, without knowing the comment subject and the comment content, but achieves the comprehension and regeneration of the comment and the control of the comment point and the comment emotion, based on the emotion analysis technology and the text comprehension technology.

Based on the above embodiment of the present disclosure, in some implementations, the generating a comment label associated with the subject opinion pair based on news information may include: determining a news label based on the news information; calculating a correlation between the news label and the comment text; and determining the news label having the correlation meeting a preset threshold value as the comment label associated with the subject opinion pair.

In the present implementation, first, a keyword in the news may be extracted as a news label to characterize the news. Here, the method for extracting the keyword in the news may be implemented in various methods, such as, using the Term Frequency-Inverse Document Frequency (TF-IDF), the topic-model, the word position weighting algorithm (Textrank) or the keyword extraction algorithm (Rake) to extract a keyword.

Then, a correlation between the news label and the comment text may be calculated. A correlation calculation method of the existing technology or of the technology to be developed in the future may be adopted, which is not limited in the present disclosure. For example, the word similarity algorithm based on the wordnet may be adopted, the text depth representation model (Word2vec) may be adopted to train to obtain the word vector to calculate the similarity, the text topic generation model (Lda) may be adopted to train to obtain the word vector to calculate the similarity, the news aggregator (GoogleNews) may be adopted to use the corpus to obtain the word similarity model and a predetermined correlation database may be adopted to calculate the correlation.

Further, the determining a news label based on the news information may include: determining a weight of words using a weight model, based on a predetermined characteristic of the words in the news information; and determining the news label, based on the weight of the words and a characteristic commonly occurring between the words.

Here, the predetermined characteristic may be a characteristic that contributes more to the news label determined based on a sample. For example, the predetermined characteristic may include one or more of the following: the number of occurrence, the occurrence position, the term frequency (Tf), the inverse document frequency (Idf), the proper noun category, and whether occurring on the title.

Here, the weight model is a model used to determine the relative importance of an indicator in the overall evaluation, such as the statistical average model, the variation coefficient model, the level analysis model and the CRITIC (Criteria Importance Though Intercrieria Correlation).

Figure 2:
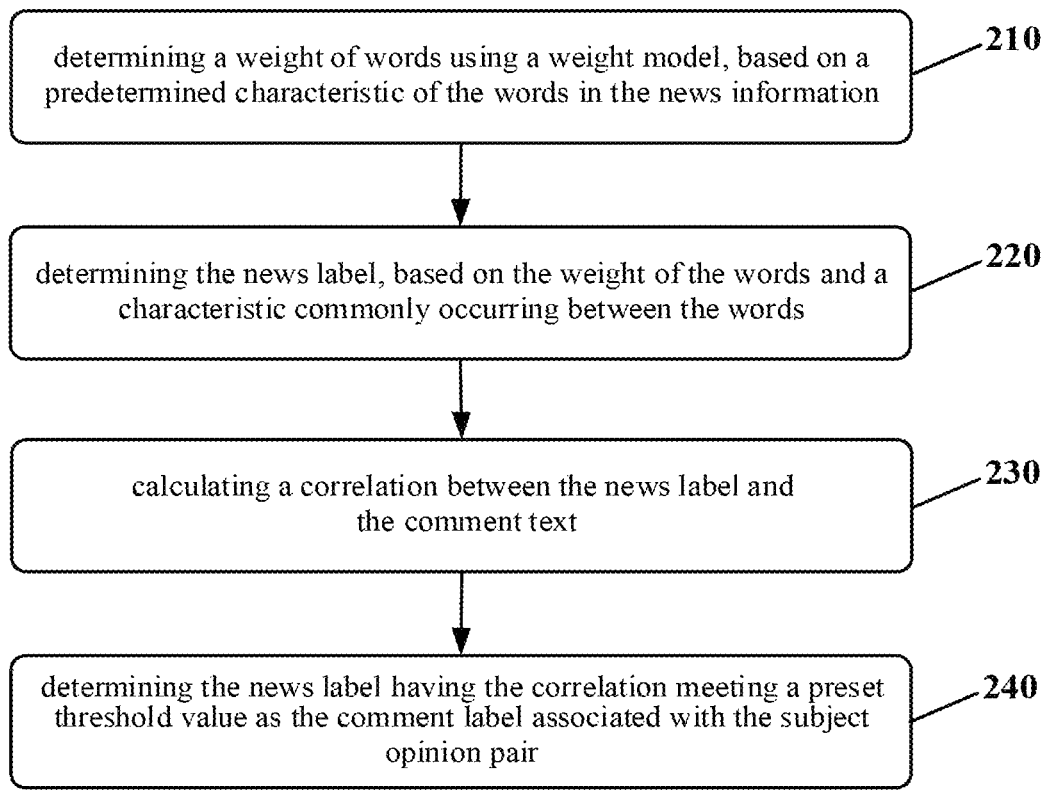
FIG. 2 is a schematic flowchart of an embodiment of a method for generating a comment label associated with the subject opinion pair based on news information according to the present disclosure.

Specifically, with reference to FIG. 2, a schematic flowchart of an embodiment of a method for generating a comment label associated with the subject opinion pair based on news information according to the present disclosure is illustrated.

As shown in FIG. 2, the method 200 for generating a comment label associated with the subject opinion pair based on news information includes:

Step 210, determining a weight of words using a weight model, based on a predetermined characteristic of the words in the news information.

In the present embodiment, the predetermined characteristic of the words in the news information may be a characteristic that contributes more to the news label determined based on a sample. For example, the predetermined characteristic may include one or more of the following: the number of occurrence, the occurrence position, the term frequency (Tf), the inverse document frequency (Idf), the proper noun category, and whether occurring on the title.

In some alternative implementations of the present embodiment, the weight model is determined by the following steps: acquiring a news information sample; and training the weight model using a support vector machine, based on the predetermined characteristic of the words in the news information sample.

In the present implementation, after the news information sample is acquired, the weight model may be trained using a support vector machine (SVM), based on the predetermined characteristic of the words.

Step 220, determining the news label, based on the weight of the words and a characteristic commonly occurring between the words.

In the present embodiment, the news label may be filtered based on the weight of the words and a characteristic commonly occurring between the words (based on a statistical probability commonly occurring between every two words, a semantic similarity measuring method (Google distance) may also be used). Specifically, the weight of each word is fine-adjusted based on the data commonly occurring between the words. For the final score of each word, in addition to the SVM score of the word, the importance of a word that commonly occurs with the word is also taken into account.

In some alternative implementations of the present embodiment, the determining a news label based on the news information further includes: extracting an event from the news information, the event comprising an event type and an event element; and determining the event as the news label if there exists an event element selected as the news label among the event element.

In the present implementation, the news information generally reports specific events, and the so-called events is described as the occurrence of an action or the change of a state in an Automatic Content Extraction (ACE) evaluation session (the ACE2005 defines 8 event categories and 33 sub-categories). Events include event types and event elements. For example, in the news "Exposure from the Internet that XXX, YYY fake play comes true, their love affair is confirmed, love affair details of XXX, YYY are dug up," the event is: "love affair confirmed, XXX, YYY, none, none>.

If a certain element of the event is selected as a news label, the whole event exists as the news label. For example, for the news "Dissatisfied with the father's old house being demolished, a woman in SS smashed the excavator with a shoulder pole and got a probation," a score for each word in the article would be given through the first step of the SVM linear model, such as "Demolish: 0.873," "SS: 0.371," "Shoulder pole: 0.574," "Probation: 0.699," "Excavator: 0.811," "Behavior: 0.126" . . . . Then in the second step, the news labels will be filtered based on the score for each word obtained in the first step, and the characteristic commonly occurring between the words (for example: "Safeguarding rights—Demolish: 0.016," "Defendant—Probation: 0.0078"). The filtered news labels of this article are: Demolish, Excavator, Probation, Shoulder pole, SS, Woman, . . . (in order to ensure the recall of the comment label, the news label is as high recallable as possible). For the extracted news event, if the event related word is not in the news label, it will be added to the news label based on the news label generated by the second step. For example, in the event: "<Smash, Woman, Excavator>," if "Smash" is not in the news labels, it would be added to the news labels.

Step 230, calculating a correlation between the news label and the comment text.

In the present embodiment, when a correlation between the news label and the comment text is calculated, any method used for calculating the correlation may be adopted to calculate the correlation. For example, the word similarity algorithm based on the wordnet may be used, the word vector may be obtained by training with the text depth representation model (Word2vec) to calculate the similarity, the word vector may be obtained by training with the text topic generation model (Lda) to calculate the similarity, and the word similarity model and a predetermined correlation database may be obtained by using the news aggregator (GoogleNews) corpus to calculate the correlation.

In some alternative implementations of the present embodiment, the calculating a correlation between the news label and the comment text may include one or more of the following: calculating a correlation between a proper noun or phrase in the news label and the comment subject, according to a thesaurus; calculating a correlation between the proper noun in the news label and the comment subject, based on a preset corresponding rule for the proper nouns; calculating a similarity between a vector generated from words in the news label and a vector generated from the comment subject based on a text depth representation model; calculating a similarity between a vector generated from words of the event and the vector generated from the comment opinion, based on the text depth representation model; and calculating a similarity between the vector generated from the words in the news label and a vector generated from notional words in the comment text after excluding the subject and the opinion, based on the text depth representation model.

In the present implementation, the news label is the candidate label of the comment label, and the correlation between the news label and the comment text is calculated as the one-dimensional important characteristic extracted by the comment label in the next step.

Exemplarily, a multi-strategy correlation calculation method may be adopted to generate a label of the comment label, including:

For the comment subject, proper nouns or phrases consistent with the comment subject may be found in the news label by using synonymous alignment. The dominant strategy of synonymous alignment are as follows: 1) direct matching using the thesaurus; 2) synonymous alignment of the proper nouns based on rules, for example: I H→H brother, old H→H brother. Since if both "I H" and "H brother" appear in the comments and news at the same time, then the probability that they are the same entity is very high; 3) generating a vector for each word based on the text depth representation model word2Vec, calculating the similarity between the notional words in the comment subject and the news label, and setting a threshold for filtering.

For an opinion word in the comment text, we determine whether the opinion is related to a particular event and, if relevant, the entire event is determined as the news label. The dominant strategy is to use the word2Vec to calculate the similarity between words of the opinion word and the news label, and to set a threshold for filtering.

For a common notional word in the comment text other than the notional words in the comment subject, the dominant strategy is to use the word2Vec to calculate the similarity between words of the notional word and the news label, and to set a threshold for filtering.

Step 240, determining the news label having the correlation meeting a preset threshold value as the comment label associated with the subject opinion pair.

In the present embodiment, based on the correlation obtained in the above step 230, if the correlation meets a preset threshold value, it may be considered that the news label is the comment label associated with the subject opinion pair.

The method for generating a comment label associated with the subject opinion pair based on news information according to the above embodiment of the present disclosure determines a weight of words using a weight model, determines the news label, based on the weight of the words and a characteristic commonly occurring between the words, and calculates a correlation between the news label and the comment text, determines the news label having the correlation meeting a preset threshold value as the comment label associated with the subject opinion pair. Accordingly, the accuracy of determining the news label is high, and the correlation between the comment label and the news label is high, a comment label determined thereof is more accurate.

An exemplary application scenario of the artificial intelligence based method for constructing a comment graph according to the embodiments of the present disclosure will be described below with reference to FIG. 3a and FIG. 3b.

Figure 3A:
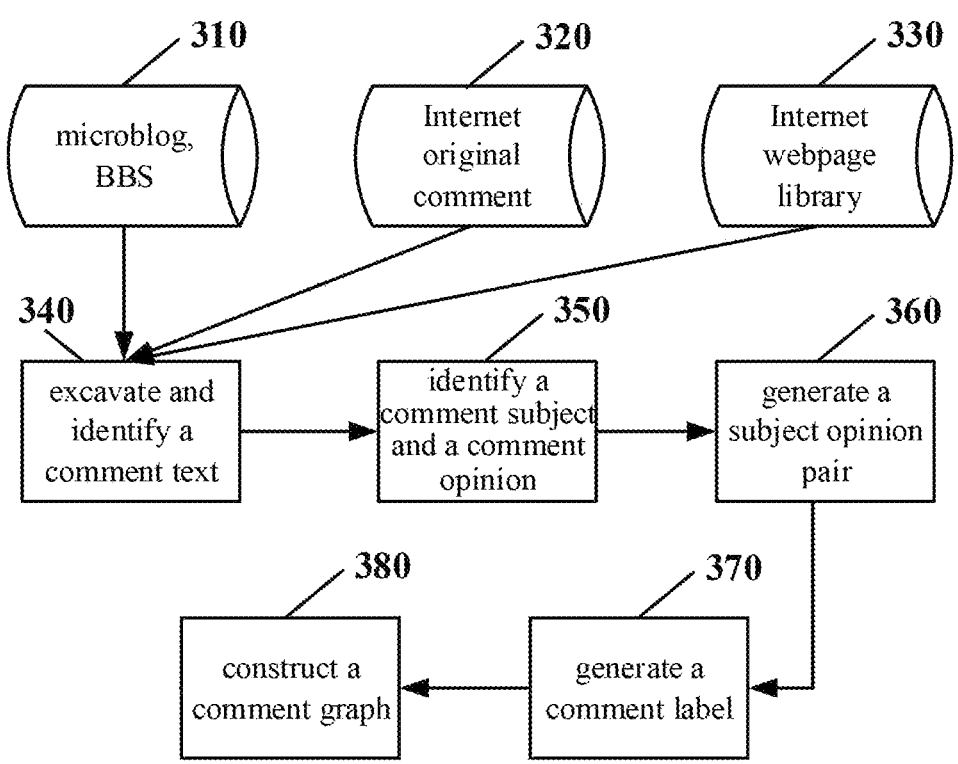
FIG. 3*a* is a schematic flowchart of an application scenario of the artificial intelligence based method for constructing a comment graph according to embodiments of the present disclosure.

As shown in FIG. 3a, a schematic flowchart of an application scenario of the artificial intelligence based method for constructing a comment graph according to the embodiments of the present disclosure is illustrated.

In FIG. 3a, first, step 340 is performed for the social media 310 such as the microblog and the BBS, the Internet original comment 320 and the Internet webpage library 330; in step 340, a comment text is excavated and identified, and then step 350 is performed; in step 350, a comment subject and a comment opinion are identified based on the characteristic in the comment text, and then step 360 is performed; in step 360, based on the identified comment subject and comment opinion, a subject opinion pair including the comment subject, the comment opinion, and an emotional tendency is generated, and then step 370 is performed; in step 370, a comment label corresponding to the subject opinion pair is generated based on the news information, and then step 380 is performed; and in step 380, a comment graph is constructed based on the subject opinion pair and the comment label.

Figure 3B:
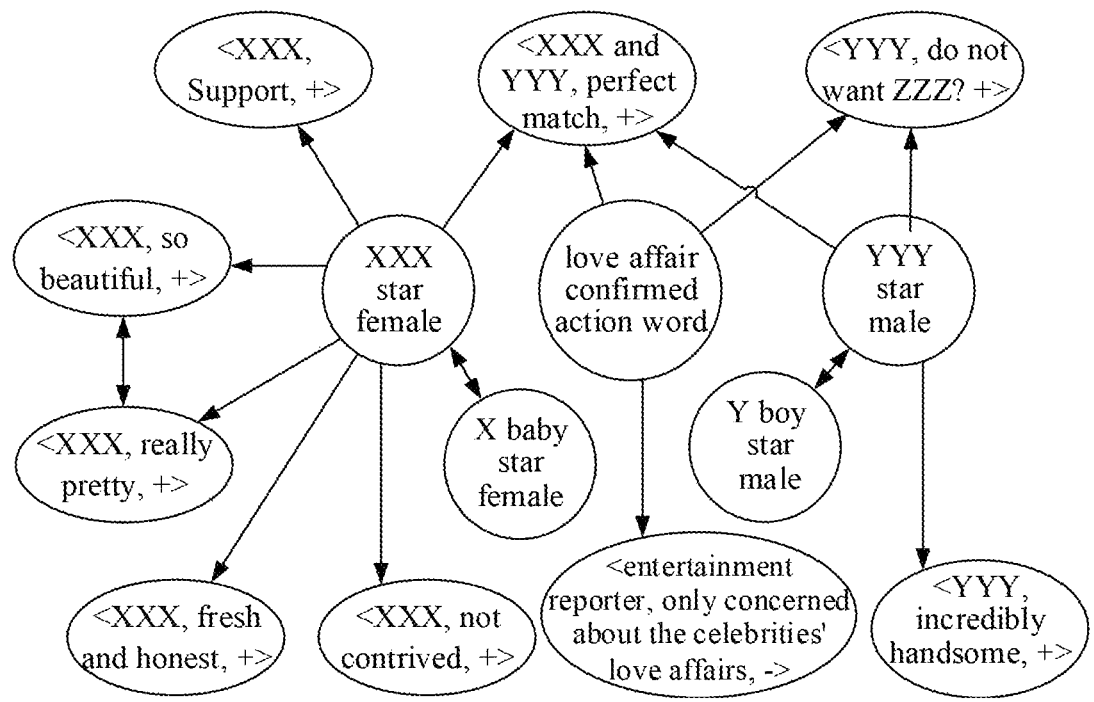
FIG. 3*b* is a comment graph constructed based on the schematic flowchart of the application scenario in FIG. 3*a*.

As shown in FIG. 3b, a comment graph constructed based on the schematic flowchart of the application scenario in FIG. 3a is illustrated.

In FIG. 3b, the comment label includes comment label content and some attributes of the label content, for example, attributes are types (including action words, names, place names, book titles, movie titles, etc.). The comment label content refers to actual meaningful words or phrases, such as proper names, nouns, notional verbs, for example, "XXX," "X baby," "love affair confirmed," "YYY" and "Y boy" in FIG. 3b.

The subject opinion pair includes: the comment subject, the comment opinion, and an emotional tendency of the comment, for example, in FIG. 3b: <XXX, support, +>, <XXX, so beautiful, +>, <XXX, really pretty, +>, <XXX, fresh and honest, +>, <XXX, not contrived, +>, <XXX and YYY, perfect match, +>, <entertainment reporter, only concerned about the celebrities' love affairs, –>, <YYY, do not want ZZZ any more, +>, <YYY, incredibly handsome, +>.

In the comment graph constructed in FIG. 3b, connecting edges between the comment label and comment nodes are established, including the six connecting edges: "XXX" to <XXX, Support, +>, "XXX" to <XXX, so beautiful, +>, "XXX" to <XXX, really pretty, +>, "XXX" to <XXX, fresh and honest, +>, "XXX" to <XXX, not contrived, +>, "XXX" to <XXX and YYY, perfect match, +>.

In the comment graph constructed in FIG. 3b, connecting edges between the comment nodes are also established, including: a connecting edge of the synonymous relationship <XXX, so beautiful, +> to <XXX, really pretty, +>. In case of the synonymous relationship, interchangeable use is possible.

In the comment graph constructed in FIG. 3b, connecting edges between the comment label nodes are also established, including: a connecting edge of the synonymous relationship "XXX" to "X baby," and a connecting edge of the synonymous relationship "YYY" to "Y boy." In case of the synonymous relationship, interchangeable use is possible.

The artificial intelligence based method for constructing a comment graph provided in the application scenario of the present disclosure improves the pertinence and the accuracy of the comment and the control to the comment emotion, when providing comments externally, and because of the abundant source and the extensive coverage of constructing the comment graph, the comments provided externally also reflect the majority of the comment opinions and improve the application range of the comment graph.

The embodiments of the present disclosure also provides a method for generating a news comment, the method including: determining a weight of words using a weight model, based on a predetermined characteristic of the words in news information; determining a news label, based on the weight of the words and a characteristic commonly occurring between the words; determining, based on the news label and the comment graph constructed according to the artificial intelligence based apparatus for constructing a comment graph, a subject opinion pair corresponding to the news label in the comment graph; and generating the news comment, based on the determined subject opinion pair.

In the present embodiment, when determining the subject opinion pair corresponding to the news label in the comment graph, based on the news label and the comment graph constructed according to the artificial intelligence based method for constructing a comment graph according to any one of the above, if the comment label included in the comment graph corresponds to the news label determined in the present embodiment, it is considered that the subject opinion pair corresponding to the comment label also corresponds to the news label.

It should be understood that the artificial intelligence based method for constructing a comment graph in the embodiment of the method for generating news comment corresponds to the embodiment of the artificial intelligence based method for constructing a comment graph shown in FIG. 1 to FIG. 3b, thus, the operations and features described in the artificial intelligence based method for constructing a comment graph in FIG. 1 to FIG. 3b are also applicable to the artificial intelligence based method for constructing a comment graph in the embodiment of the method for generating news comment, and detailed description thereof is omitted.

The method for generating news comment provided by the embodiments of the present disclosure improves the pertinence and the accuracy of the comment and the control to the comment emotion, and because of the abundant source and the extensive coverage of constructing the comment graph, the comments provided externally also reflect the majority of the comment opinions and the application range of the comment graph is improved.

Figure 4:
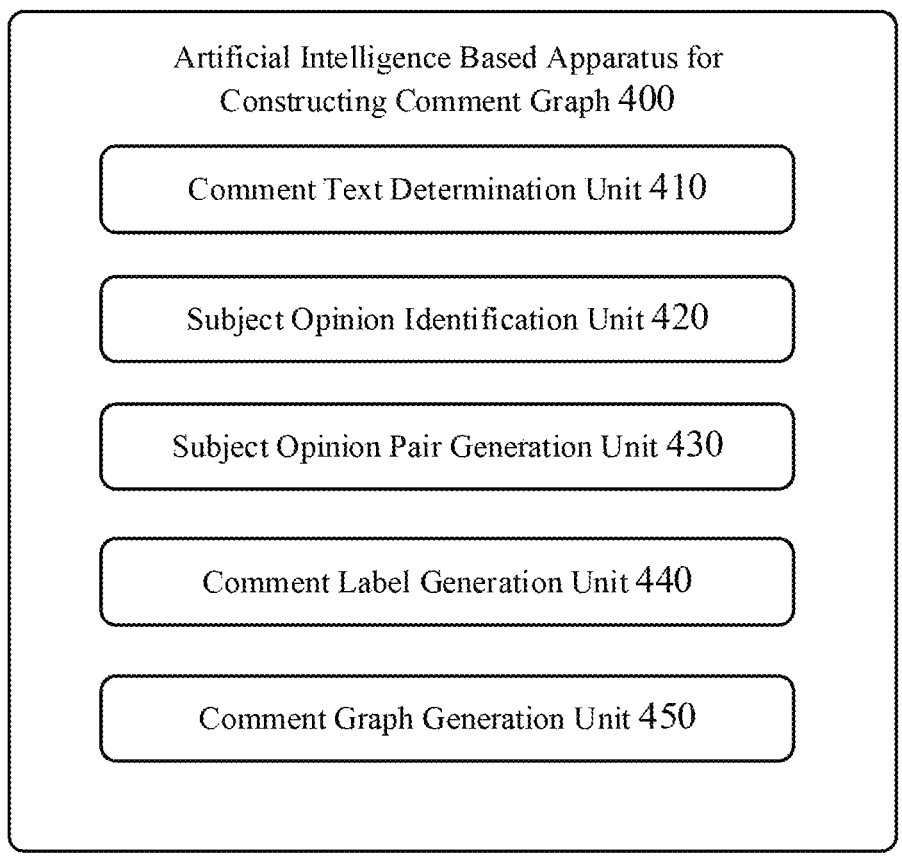
FIG. 4 is an exemplary structural diagram of an embodiment of an artificial intelligence based apparatus for constructing a comment graph according to the present disclosure.

With further reference to FIG. 4, as an implementation to the above method, the embodiments of the present disclosure provide an embodiment of an artificial intelligence based apparatus for constructing a comment graph. The embodiment of the artificial intelligence based method for constructing a comment graph corresponds to the embodiment of the artificial intelligence based method for constructing a comment graph shown in FIG. 1 to FIG. 3b, thus, the operations and features described in the artificial intelligence based method for constructing a comment graph in FIG. 1 to FIG. 3b are also applicable to the artificial intelligence based apparatus 400 for constructing a comment graph and the units contained therein, and detailed description thereof is omitted.

As shown in FIG. 4, the artificial intelligence based apparatus 400 for constructing a comment graph includes: a comment text determination unit 410, configured for determining a comment text based on comment data on a network page; a subject opinion identification unit 420, configured for identifying a comment subject and a comment opinion in the comment text, based on a characteristic in the comment text; a subject opinion pair generation unit 430, configured for generating a subject opinion pair including the comment subject, the comment opinion and an emotional tendency based on the comment subject and the comment opinion; a comment label generation unit 440, configured for generating a comment label associated with the subject opinion pair based on news information; and a comment graph generation unit 450, configured for generating a comment graph, based on the comment label and the subject opinion pair.

In some alternative implementations of the present embodiment, the subject opinion pair generation unit is further configured for: extracting the subject opinion pair comprising the comment subject, the comment opinion and the emotional tendency based on the comment subject, the comment opinion and one or more of: text information, co-occurrence information and an entity type of the comment text.

In some alternative implementations of the present embodiment (not shown in the figures), the comment label generation unit includes: a news label determination unit, configured for determining a news label based on the news information; a correlation calculation unit, configured for calculating a correlation between the news label and the comment text; and a comment label determination unit, configured for determining the news label having the correlation meeting a preset threshold value as the comment label associated with the subject opinion pair.

In some alternative implementations of the present embodiment (not shown in the figures), the news label determination unit includes: a words weight determination subunit, configured for determining a weight of words using a weight model, based on a predetermined characteristic of the words in the news information; and a news label determination subunit, configured for determining the news label, based on the weight of the words and a characteristic commonly occurring between the words.

In some alternative implementations of the present embodiment, the weight model in the words weight determination subunit is determined by the following steps: acquiring a news information sample; and training the weight model using a support vector machine, based on the predetermined characteristic of the words in the news information sample.

In some alternative implementations of the present embodiment (not shown in the figures), the news label determination unit further includes: a news event extraction subunit, configured for extracting an event from the news information, the event comprising an event type and an event element; and a news event determination subunit, configured for determining the event as the news label if there exists an event element selected as the news label among the event element.

In some alternative implementations of the present embodiment, the correlation calculation unit is further configured for one or more of: calculating a correlation between a proper noun or phrase in the news label and the comment subject, according to a thesaurus; calculating a correlation between the proper noun in the news label and the comment subject, based on a preset corresponding rule for the proper nouns; calculating a similarity between a vector generated from words in the news label and a vector generated from the comment subject based on a text depth representation model; calculating a similarity between a vector generated from words of the event and the vector generated from the comment opinion, based on the text depth representation model; and calculating a similarity between the vector generated from the words in the news label and a vector generated from notional words in the comment text after excluding the subject and the opinion, based on the text depth representation model.

In some alternative implementations of the present embodiment (not shown in the figures), the comment graph generation unit includes: a label node determination unit, configured for determining the comment label as label nodes of the comment graph; a comment node determination unit, configured for determining the subject opinion pair as comment nodes of the comment graph; and a label comment connecting unit, configured for establishing a connecting relationship between the label nodes and the comment nodes corresponding to the label nodes.

In some alternative implementations of the present embodiment (not shown in the figures), the comment graph generation unit further includes: an associated comment connecting unit, configured for establishing a connecting relationship between the comment nodes that are semantically associated; and/or an semantically identical label connecting unit, configured for establishing a connecting relationship between the label nodes that are semantically identical.

In some alternative implementations of the present embodiment (not shown in the figures), the associated comment connecting unit includes: a semantic comment connecting unit, configured for establishing a connecting relationship between the comment nodes that are semantically identical and/or semantically opposite.

The embodiments of the present disclosure further provides an apparatus for generating a news comment, the apparatus including: a words weight determination unit, configured for determining a weight of words using a weight model, based on a predetermined characteristic of the words in news information; a news label determination unit, configured for determining a news label, based on the weight of the words and a characteristic commonly occurring between the words; a subject opinion pair determination unit, configured for determining a subject opinion pair corresponding to the news label in a comment graph, based on the news label and the comment graph constructed according to the artificial intelligence based apparatus for constructing a comment graph according to any one of the above; and a news comment generation unit, configured for generating the news comment, based on the determined subject opinion pair.

In the present embodiment, it should be understood that the news label determination unit in the apparatus for generating a news comment is configured for generating a label for the news information that needs to be currently commented; and the news label determination unit in the artificial intelligence based apparatus for constructing a comment graph is configured for generating a label for the news information in the news information sample, both of which target different news information. In addition, the embodiment of the apparatus for generating a news comment corresponds to the embodiment of the above apparatus for generating a news comment, thus, the operations and features described for the method for generating a news comment are also applicable to the apparatus for generating a news comment and the units contained therein, and detailed description thereof will be omitted.

The present disclosure also provides an embodiment of a device, including: one or more processors; a storage apparatus, to store one or more programs; and when the one or more programs being executed by the one or more processors, cause the one or more processors to implement the artificial intelligence based method for constructing a comment graph of any one of the above.

The present disclosure also provides an embodiment of a computer readable storage medium, storing a computer program thereon, the computer program, when executed by a processor, implements the artificial intelligence based method for constructing a comment graph of any one of the above.

Figure 5:
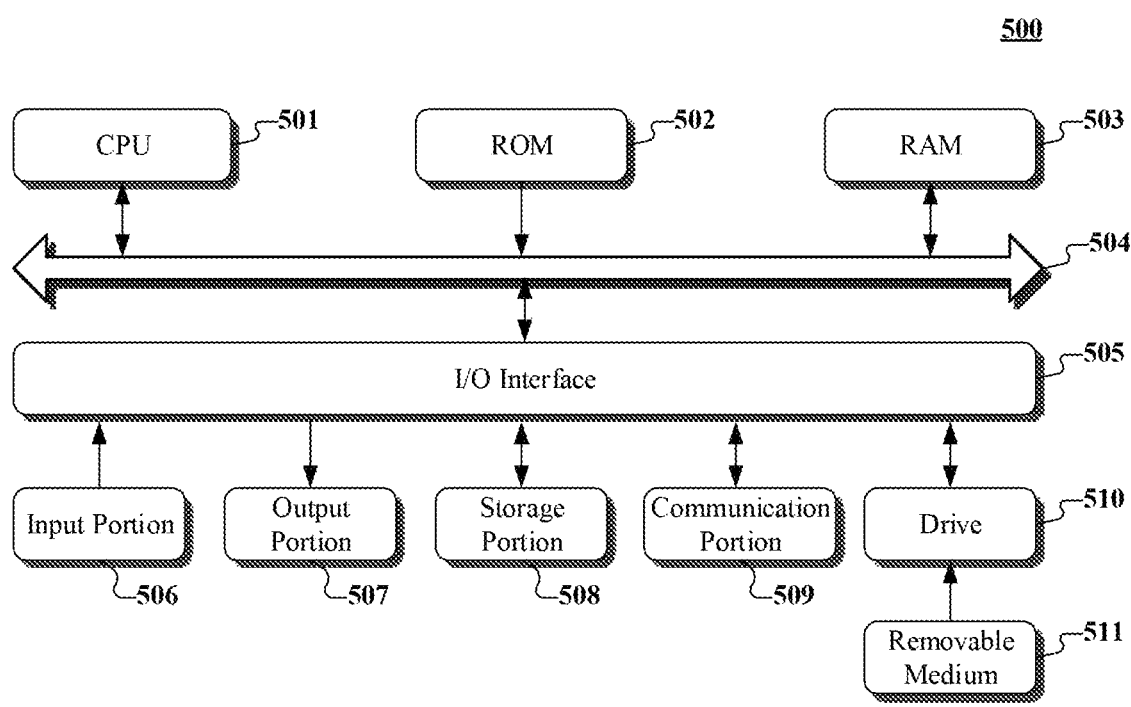
FIG. 5 is a schematic structural diagram of a computer system adapted to implement a terminal device or a server of the embodiments of the present disclosure.

With reference to FIG. 5, a schematic structural diagram of a computer system 500 adapted to implement a terminal device/server of the embodiments of the present disclosure is illustrated. The terminal device shown in FIG. 5 is merely an example and should not impose any restriction on the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, including a comment text determination unit, a subject opinion identification unit, a subject opinion pair generation unit a comment label generation unit and a comment graph generation unit, where the names of these units or modules do not in some cases constitute a limitation to such units or modules themselves. For example, the comment text determination unit unit may also be described as "a unit for determining a comment text based on comment data on a network page."

In another aspect, the present application further provides a non-volatile computer-readable storage medium. The non-volatile computer-readable storage medium may be the non-volatile computer-readable storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: determine a comment text based on comment data on a network page; identify a comment subject and a comment opinion in the comment text, based on a characteristic in the comment text; generate a subject opinion pair including the comment subject, the comment opinion and an emotional tendency based on the comment subject and the comment opinion; generate a comment label associated with the subject opinion pair based on news information; and generate a comment graph, based on the comment label and the subject opinion pair.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A computer-implemented method for generating a news comment, the method comprising:
    determining a weight of words using a pre-trained weight model, based on a predetermined characteristic of the words in news information;
    determining a news label, based on the weight of the words and a characteristic commonly occurring between the words;
    determining, based on the news label and a pre-constructed comment graph, a subject opinion pair corresponding to the news label in the comment graph; and
    generating the news comment, based on the determined subject opinion pair;
    wherein the comment graph is constructed by:
    determining a comment text based on comment data on a network page;
    identifying a comment subject and a comment opinion in the comment text, based on a characteristic in the comment text;
    generating a subject opinion pair including the comment subject, the comment opinion and an emotional tendency based on the comment subject and the comment opinion;
    generating a comment label associated with the subject opinion pair based on news information; and
    generating the comment graph, based on the comment label and the subject opinion pair.

2. The method according to claim 1, wherein the generating a subject opinion pair including the comment subject, the comment opinion and an emotional tendency based on the comment subject and the comment opinion comprises:
    extracting the subject opinion pair comprising the comment subject, the comment opinion and the emotional tendency based on the comment subject, the comment opinion and one or more of: text information, co-occurrence information and an entity type of the comment text.

3. The method according to claim 1, wherein the generating a comment label associated with the subject opinion pair based on news information comprises:
    determining a news label based on the news information;
    calculating a correlation between the news label and the comment text; and
    determining the news label having the correlation meeting a preset threshold value as the comment label associated with the subject opinion pair.

4. The method according to claim 3, wherein the determining a news label based on the news information comprises:

determining a weight of words using the pre-trained weight model, based on a predetermined characteristic of the words in the news information; and determining the news label, based on the weight of the words and a characteristic commonly occurring between the words.

5. The method according to claim 4, wherein the weight model is determined by the following steps:

acquiring a news information sample; and training the weight model using a support vector machine, based on the predetermined characteristic of the words in the news information sample.

6. The method according to claim 4, wherein the determining a news label based on the news information further comprises:

extracting an event from the news information, the event comprising an event type and an event element; and determining the event as the news label if there exists an event element selected as the news label among the event element.

7. The method according to claim 3, wherein the calculating a correlation between the news label and the comment text comprises one or more of:

calculating a correlation between a proper noun or phrase in the news label and the comment subject, according to a thesaurus;

calculating a correlation between the proper noun in the news label and the comment subject, based on a preset corresponding rule for the proper nouns;

calculating a similarity between a vector generated from words in the news label and a vector generated from the comment subject based on a text depth representation model;

calculating a similarity between a vector generated from words of the event and the vector generated from the comment opinion, based on the text depth representation model; and calculating a similarity between the vector generated from the words in the news label and a vector generated from notional words in the comment text after excluding the subject and the opinion, based on the text depth representation model.

8. The method according to claim 1, wherein the generating a comment graph, based on the comment label and the subject opinion pair comprises:

determining the comment label as label nodes of the comment graph;

determining the subject opinion pair as comment nodes of the comment graph; and establishing a connecting relationship between the label nodes and the comment nodes corresponding to the label nodes.

9. The method according to claim 8, wherein the generating the comment graph, based on the comment label and the subject opinion pair further comprises:

establishing a connecting relationship between the comment nodes that are semantically associated; and/or establishing a connecting relationship between the label nodes that are semantically identical.

10. The method according to claim 9, wherein the establishing a connecting relationship between the comment nodes that are semantically associated comprises:

establishing a connecting relationship between the comment nodes that are semantically identical and/or semantically opposite.

11. An apparatus for generating a news comment, the apparatus comprising:

at least one processor; and a memory storing instructions, wherein the processor is configured to execute the instructions to:

determine a weight of words using a pre-trained weight model, based on a predetermined characteristic of the words in news information;

determine a news label, based on the weight of the words and a characteristic commonly occurring between the words;

determine, based on the news label and a pre-constructed comment graph, a subject opinion pair corresponding to the news label in the comment graph; and generate the news comment, based on the determined subject opinion pair;

wherein the comment graph is constructed by:

determining a comment text based on comment data on a network page;

identifying a comment subject and a comment opinion in the comment text, based on a characteristic in the comment text;

generating a subject opinion pair including the comment subject, the comment opinion and an emotional tendency based on the comment subject and the comment opinion;

generating a comment label associated with the subject opinion pair based on news information; and generating the comment graph, based on the comment label and the subject opinion pair.

12. The apparatus according to claim 11, wherein the generating a subject opinion pair including the comment subject, the comment opinion and an emotional tendency based on the comment subject and the comment opinion comprises:

extracting the subject opinion pair comprising the comment subject, the comment opinion and the emotional tendency based on the comment subject, the comment opinion and one or more of: text information, co-occurrence information and an entity type of the comment text.

13. The apparatus according to claim 11, wherein the generating a comment label associated with the subject opinion pair based on news information comprises:

determining a news label based on the news information;

calculating a correlation between the news label and the comment text; and determining the news label having the correlation meeting a preset threshold value as the comment label associated with the subject opinion pair.

14. The apparatus according to claim 13, wherein the determining a news label based on the news information comprises:

determining a weight of words using the pre-trained weight model, based on a predetermined characteristic of the words in the news information; and determining the news label, based on the weight of the words and a characteristic commonly occurring between the words.

15. The apparatus according to claim 14, wherein the weight model is determined by the following steps:

acquiring a news information sample; and training the weight model using a support vector machine, based on the predetermined characteristic of the words in the news information sample.

16. The apparatus according to claim 14, wherein the determining a news label based on the news information further comprises:

extracting an event from the news information, the event comprising an event type and an event element; and determining the event as the news label if there exists an event element selected as the news label among the event element.

17. The apparatus according to claim 13, wherein the calculating a correlation between the news label and the comment text comprises one or more of:

calculating a correlation between a proper noun or phrase in the news label and the comment subject, according to a thesaurus;

calculating a correlation between the proper noun in the news label and the comment subject, based on a preset corresponding rule for the proper nouns;

calculating a similarity between a vector generated from words in the news label and a vector generated from the comment subject based on a text depth representation model;

calculating a similarity between a vector generated from words of the event and the vector generated from the comment opinion, based on the text depth representation model; and calculating a similarity between the vector generated from the words in the news label and a vector generated from notional words in the comment text after excluding the subject and the opinion, based on the text depth representation model.

18. The apparatus according to claim 11, wherein the generating the comment graph, based on the comment label and the subject opinion pair comprises:

determining the comment label as label nodes of the comment graph;

determining the subject opinion pair as comment nodes of the comment graph; and establishing a connecting relationship between the label nodes and the comment nodes corresponding to the label nodes.

19. The apparatus according to claim 18, wherein the generating a comment graph, based on the comment label and the subject opinion pair further comprises:

establishing a connecting relationship between the comment nodes that are semantically associated; and/or establishing a connecting relationship between the label nodes that are semantically identical.

20. The apparatus according to claim 19, wherein the establishing a connecting relationship between the comment nodes that are semantically associated comprises:

establishing a connecting relationship between the comment nodes that are semantically identical and/or semantically opposite.

21. A non-transitory computer storage medium storing a computer program, wherein the processor is configured to execute the computer program to:

determine a weight of words using a pre-trained weight model, based on a predetermined characteristic of the words in news information;

determine a news label, based on the weight of the words and a characteristic commonly occurring between the words;

determine, based on the news label and a pre-constructed comment graph, a subject opinion pair corresponding to the news label in the comment graph; and generate the news comment, based on the determined subject opinion pair;

wherein the comment graph is constructed by:

determining a comment text based on comment data on a network page;

identifying a comment subject and a comment opinion in the comment text, based on a characteristic in the comment text;

generating a subject opinion pair including the comment subject, the comment opinion and an emotional tendency based on the comment subject and the comment opinion;

generating a comment label associated with the subject opinion pair based on news information; and generating the comment graph, based on the comment label and the subject opinion pair.

\* \* \* \* \*